United States Patent
Toda

(10) Patent No.: US 8,965,690 B2
(45) Date of Patent: Feb. 24, 2015

(54) SATELLITE NAVIGATION/DEAD-RECKONING NAVIGATION INTEGRATED POSITIONING DEVICE

(75) Inventor: Hiroyuki Toda, The Presidio of San Francisco, CA (US)

(73) Assignee: Furuno Electrics Co., Ltd., Nishinomiya (JP)

( * ) Notice: Subject to any disclaimer, the term of this patent is extended or adjusted under 35 U.S.C. 154(b) by 815 days.

(21) Appl. No.: 12/918,016

(22) PCT Filed: Jan. 21, 2009

(86) PCT No.: PCT/JP2009/050899
§ 371 (c)(1),
(2), (4) Date: Aug. 17, 2010

(87) PCT Pub. No.: WO2009/107424
PCT Pub. Date: Sep. 3, 2009

(65) Prior Publication Data
US 2010/0332135 A1  Dec. 30, 2010

(30) Foreign Application Priority Data

Feb. 29, 2008  (JP) .................................. 2008-051145

(51) Int. Cl.
*G01C 21/10*  (2006.01)
*G01S 19/49*  (2010.01)
(Continued)

(52) U.S. Cl.
CPC ............... *G01C 21/165* (2013.01); *G01S 19/49* (2013.01); *G01C 21/28* (2013.01)
USPC ............................ 701/472; 701/431; 701/500

(58) Field of Classification Search
USPC ........................................................ 701/400
See application file for complete search history.

(56) References Cited

U.S. PATENT DOCUMENTS 5,828,987 A * 10/1998 Tano et al. ..................... 702/150
5,935,191 A *  8/1999 Sakanashi et al. ............ 701/500
(Continued)

FOREIGN PATENT DOCUMENTS

EP    1 260 831 A1   11/2002
JP      8-50024 A    2/1996
(Continued)

*Primary Examiner* — Ariel Yu
(74) *Attorney, Agent, or Firm* — Birch, Stewart, Kolasch & Birch, LLP

(57) ABSTRACT

Even when inertial navigation is performed, whether or not the correction of a value detected by an external sensor is appropriate can be judged, so that a dramatically degraded positioning result is prevented from being outputted. A navigation device (100) comprises a GPS receiver (11), an acceleration sensor (12) for detecting at least two-axis accelerations in an X-axis direction that is the front-back direction of a moving body and a Y-axis direction that is the right-left direction of the moving body, and a at least one-axis angular velocity sensor (13) for detecting the angular velocity in an azimuth direction around a Z-axis orthogonal to the X-axis direction and the Y-axis direction. A sensor detection value appropriate correction judgment module (22) of an integrated calculation module (30) having a CPU or the like finds the product of the value (velocity) obtained by integrating the acceleration detection value in the X-axis direction and the angular velocity detection value in the azimuth direction, acquires the error between the value of the product and the acceleration detection value in the Y-axis direction, and judges whether or not corrections made by the acceleration sensor and the angular velocity sensor are appropriate by judging whether or not the error exceeds a predetermined threshold value.

11 Claims, 4 Drawing Sheets

(51) Int. Cl.
*G01C 21/16* (2006.01)
*G01C 21/28* (2006.01)

(56) References Cited

U.S. PATENT DOCUMENTS

| | | |
|---|---|---|
| 6,167,347 A | 12/2000 | Lin |
| 6,240,367 B1 | 5/2001 | Lin |
| 6,246,960 B1 | 6/2001 | Lin |
| 6,292,750 B1 | 9/2001 | Lin |
| 6,311,129 B1 | 10/2001 | Lin |
| 6,408,245 B1 | 6/2002 | An et al. |
| 6,480,152 B2 | 11/2002 | Lin et al. |
| 6,697,736 B2 | 2/2004 | Lin |
| 6,785,609 B2 | 8/2004 | Suda |
| 7,355,549 B2 | 4/2008 | Fukuda et al. |
| 8,001,839 B2 * | 8/2011 | Sugihara et al. ............. 73/493 |
| 2007/0067126 A1 * | 3/2007 | Adachi .......................... 702/86 |
| 2008/0243384 A1 * | 10/2008 | Ohkubo et al. ............... 701/220 |
| 2008/0294342 A1 * | 11/2008 | Hoshizaki et al. ............ 701/216 |

FOREIGN PATENT DOCUMENTS

| | | |
|---|---|---|
| JP | 09-096535 | 4/1997 |
| JP | 10-153443 | 6/1998 |
| JP | 2002-333332 A | 11/2002 |
| JP | 3380404 B2 | 2/2003 |
| JP | 2006-71474 A | 3/2006 |
| JP | 2006-242578 A | 9/2006 |
| JP | 2007-71868 A | 3/2007 |

* cited by examiner

SATELLITE NAVIGATION/DEAD-RECKONING NAVIGATION INTEGRATED POSITIONING DEVICE

TECHNICAL FIELD

The present invention relates to a satellite navigation/dead-reckoning navigation integrated positioning device that integrates an observation obtained by receiving a positioning signal from a navigation satellite and an observation obtained from an external sensor such as an acceleration sensor to perform positioning.

BACKGROUND ART

In the past, there has been used a satellite navigation/dead-reckoning navigation integrated positioning device which integrates a satellite navigation calculation based on an observation obtained from, for example, a GPS positioning system as a non-autonomous system and an inertial navigation calculation based on a value detected by an external sensor such as an acceleration sensor and an angular velocity sensor to find navigation data including a position, a velocity, an azimuth and the like of a moving body (for example, refer to Patent Document 1).

REFERENCE DOCUMENTS OF RELATED ART

Patent Document 1: Japanese Patent No. 3380404

DISCLOSURE OF THE INVENTION

Problems to be Solved by the Invention

In such a satellite navigation/dead-reckoning navigation integrated positioning device, accuracy of detection values of the external sensor matters. In the satellite navigation/dead-reckoning navigation integrated positioning device using the acceleration sensor and angular velocity sensor of low cost, if correction for these external sensors is not appropriately performed, when a positioning signal from the navigation satellite is interrupted, positioning accuracy is dramatically degraded due to an influence of the detection values of low accuracy from the external sensors.

However, there has been no means for determining whether or not the correction for the external sensors is appropriately performed during the interruption of the positioning signal from the navigation satellite; thus, the inertial navigation calculation has to be continued using the detection values of the external sensors to output results thereof.

Therefore, an object of the invention is to provide a satellite navigation/dead-reckoning navigation integrated positioning device that can determine whether or not the correction for the detection value of the external sensors is appropriate; even when the inertial navigation is performed while the positioning signal cannot be received from the navigation satellite, and can stop continuing the erroneous positioning calculation or outputting the erroneous navigation data to solve the above problems.

Means for Solving the Problems

In order to solve the problems, the satellite navigation/dead-reckoning navigation integrated positioning device of the invention is configured as below.

(1) According to an aspect of the invention, a satellite navigation/dead-reckoning navigation integrated positioning device includes an integrated positioning calculation module for finding navigation data of a moving body based on a positioning signal of a navigation satellite and a detection value of an external sensor, and finding a correction value for the detection value of the external sensor to feedback to the detection value of the external sensor. The external sensor includes at least an acceleration sensor for detecting an acceleration and an angular velocity sensor for detecting an angular velocity. The device includes a sensor detection value appropriate correction judgment module for finding errors of a detection value of the acceleration sensor and a detection value of the angular velocity sensor to determine whether or not the error exceeds a predetermined threshold value.

(2) According to another aspect of the invention, a satellite navigation/dead-reckoning navigation integrated positioning device includes an integrated positioning calculation module for finding navigation data (position and velocity) of a moving body based on a positioning signal of a navigation satellite and a detection value of an external sensor and finding a correction value for the detection value of the external sensor to feedback to the detection value of the external sensor. The external sensor includes an acceleration sensor for detecting at least two-axis accelerations in an X-axis direction that is a front-back direction of the moving body and a Y-axis direction that is a right-left direction of the moving body, and an at least one-axis angular velocity sensor for detecting an angular velocity in an azimuth direction (gyration direction) around a Z-axis orthogonal to the X-axis direction and the Y-axis direction. The device includes a module for finding a product (=centrifugal force) of a velocity in the X-axis direction (direction of the tangent to an arc) obtained by integrating the detection values of the acceleration sensor for detecting the acceleration in the X-axis direction and the detection value of the angular velocity sensor, and finding a difference between the detection value of the acceleration sensor for detecting the acceleration in the Y-axis direction and the product (centrifugal force) to determine whether or not the correction for the detection values of the acceleration sensor and the angular velocity sensor are appropriate by determining whether or not the difference exceeds a predetermined threshold value.

That is, here, when assuming
Vx is a velocity in a direction of forward movement,
ωz is an angular velocity in an azimuth direction, and
ay is a centrifugal force,
whether or not the correction for the acceleration sensor and the angular velocity sensor is appropriate is determined by determining whether or not a relation of $$ay = Vx \cdot \omega z \quad (1)$$

is satisfied in a range of a certain acceptable error or a tolerance.

This makes it possible to determine whether or not the correction for the external sensor is appropriately performed even if the positioning signal from the navigation satellite is interrupted. Therefore, the problems can be avoided in which the inertial navigation calculation is continued using the detection value of the external sensor for which the appropriate correction is not performed, and in which the dramatically degraded navigation data using the detection value of the external sensor for which the appropriate correction is not performed is output.

(3) The integrated positioning calculation module, when the correction is determined to be appropriate, may continue positioning calculations using the detection values of the acceleration sensor and the angular velocity sensor or output a result of the positioning calculation, and when the correction is determined to be not appropriate, may stop the positioning calculations using the detection value of the external sensor or output values such as a result of the positioning calculation immediately before stopping the positioning calculation other than the result of the positioning calculation using the detection value of the external sensor.

With this configuration, the navigation data dramatically degraded in accuracy can be prevented from being output, thus, preventing abnormal navigation data from being provided to a user.

(4) The appropriate correction determination module may perform the determination when an absolute value of a velocity in an X-axis direction and an absolute value of the angular velocity in an azimuth direction respectively exceeds a predetermined threshold value.

This makes it possible to prevent unnecessary determinations and heightens the determination accuracy.

(5) The appropriate correction determination module may perform the determination depending on whether or not an absolute value of a product of a velocity in an X-axis direction and the angular velocity in an azimuth direction exceeds a comparison value including an absolute value of the acceleration in a Y-axis direction.

This makes it possible to accurately determine whether or not the correction for the detection value of any of the respective sensors is inappropriate by a simple calculation.

(6) The appropriate correction determination module may perform the determination depending on whether or not a product of a velocity in an X-axis direction and the angular velocity in an azimuth direction has the same sign as the acceleration in a Y-axis direction.

This makes it possible to accurately determine whether or not the correction for any of the detection value of the acceleration sensor in the X-axis direction, the detection value of the angular velocity sensor in the azimuth direction, and the detection value of the acceleration sensor in the Y-axis direction is inappropriate.

Effect of the Invention

According to the invention, it is possible to determine whether or not the correction for the external sensor is appropriately performed even in a state where the positioning signal from the navigation satellite is interrupted. Therefore, the problems can be avoided where the inertial navigation calculation is continued using the detection value of the external sensor for which the appropriate correction is not performed and where the dramatically degraded navigation data using the detection value of the external sensor for which the appropriate correction is not performed is output.

BEST MODE FOR CARRYING OUT THE INVENTION

First Embodiment

Figure 1:
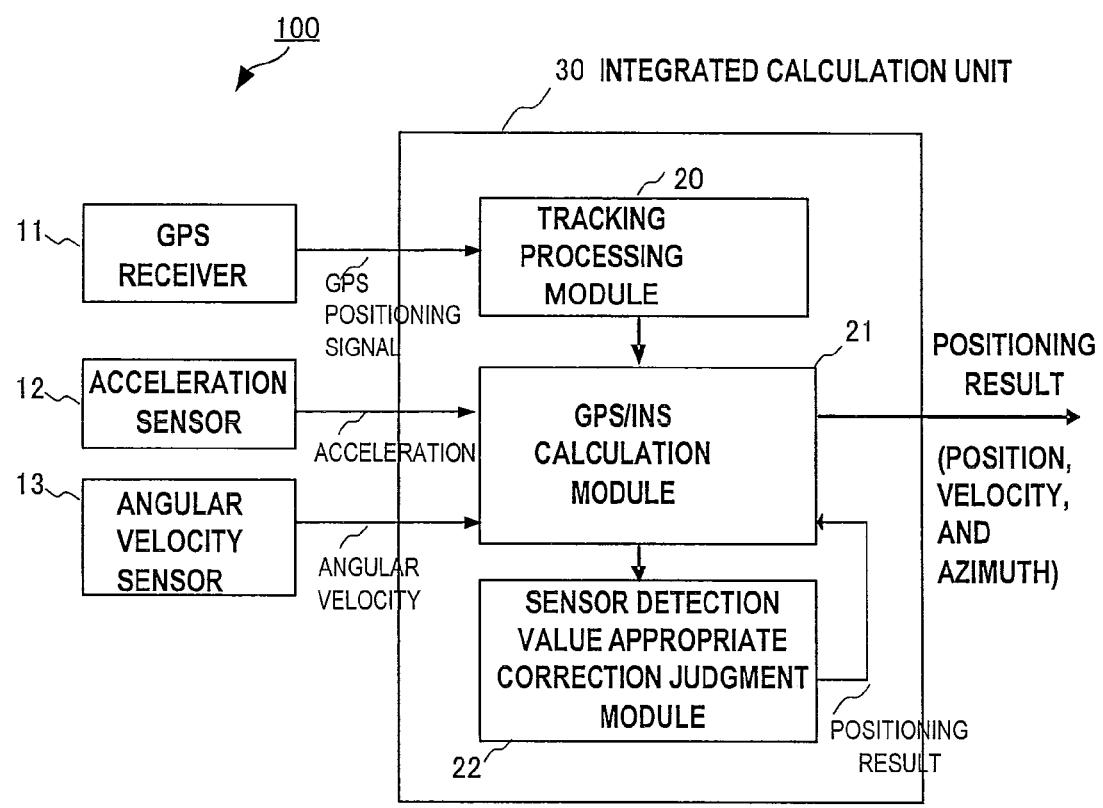
FIG. 1 is a block diagram showing a configuration of a satellite navigation/dead-reckoning navigation integrated positioning device according to an embodiment of the invention.

FIG. 1 shows a configuration of a satellite navigation/dead-reckoning navigation integrated positioning device according to the invention (hereinafter, simply referred to as "navigation device"). As shown in FIG. 1, a navigation device 100 includes a GPS receiver 11, an acceleration sensor 12, an angular velocity sensor 13 having a vibrating gyroscope, and an integrated calculation module 30 having a CPU or the like, and is mounted on a moving body.

The GPS receiver 11 receives a positioning signal transmitted from a GPS satellite as a navigation satellite and outputs a GPS positioning signal.

The acceleration sensor 12 detects at least two-axis accelerations in an X-axis direction which is a front-back direction of the moving body and a Y-axis direction which is a right-left direction of the moving body. The angular velocity sensor 13 detects an angular velocity in an azimuth direction (gyration direction) around a Z-axis orthogonal to the X-axis direction and the Y-axis direction, respectively. The acceleration sensor 12 and the angular velocity sensor 13 correspond to an "external sensor" according to the invention.

The integrated calculation module 30 can be represented by, if a calculation processing content thereof is made into blocks, a tracking processing module 20, a GPS/INS calculation module 21 and a sensor detection value appropriate correction judgment module 22.

The tracking processing module 20 is input with the GPS positioning signal from the GPS receiver 11 to track a phase of the GPS positioning signal in a baseband obtained by receiving a signal from each GPS satellite and finds a pseudo range, a Doppler frequency observation, a position and a velocity of each satellite, and the like.

The GPS/INS calculation module 21 finds a position and a velocity at a receiving point based on the pseudo range and the Doppler frequency observation, the position and velocity of each satellite, and the like. Further, the GPS/INS calculation module executes the GPS/INS integrated calculation based on the pseudo range, the Doppler frequency observation, and the detection signals of the angular velocity sensor 13 and the acceleration sensor 12. The GPS/INS calculation module 21 corresponds to an "integrated positioning calculation module" according to the invention. The GPS/INS calculation module 21 executes, while the GPS positioning signal is obtained, the GPS/INS integrated positioning calculation to output the navigation data such as the position, velocity and azimuth as a positioning result to a user device. Further, the GPS/INS calculation module, besides executing the integrated calculation of the GPS/INS, performs corrections for the detection values of the acceleration sensor 12 and the angular velocity sensor 13. That is, the GPS/INS calculation module finds correction values for the detection values of the acceleration sensor 12 and the angular velocity sensor 13 so that the result of the inertial navigation calculation matches a result of the GPS calculation, and then feedbacks these to the detection values of the acceleration sensor 12 and the angular velocity sensor 13.

The GPS/INS calculation module 21 executes, while the GPS positioning signal is not obtained, the inertial navigation calculation based on the detection values of the acceleration sensor 12 and the angular velocity sensor 13 to output the navigation data such as the position, velocity, azimuth and the like as a positioning result to the user device.

The sensor detection value appropriate correction determination module 22 determines whether or not the correction for the detection values of the acceleration sensor 12 and the angular velocity sensor 13 is appropriate by a method described later.

Figure 2:
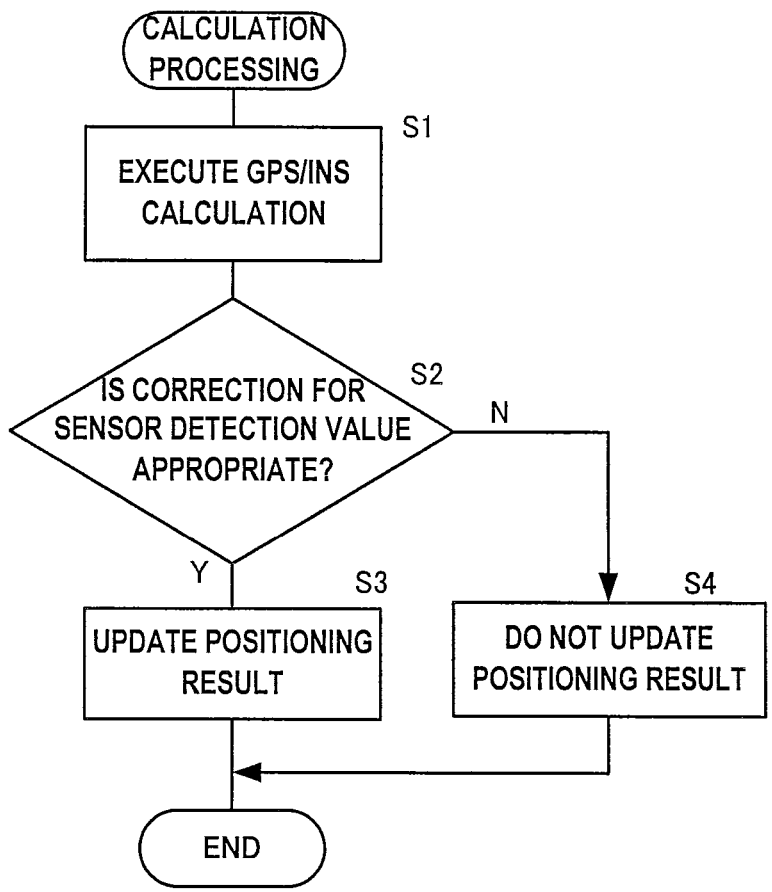
FIG. 2 is a flowchart showing a determination of appropriate correction for a sensor detection value and a processing content associated with a result of the determination in an integrated calculation module 30 of a navigation device, shown in FIG. 1.

FIG. 2 is a flowchart showing a determination of whether or not the correction for the sensor detection value is appropriate and a processing content associated with a result of the determination in the integrated calculation module 30 of the navigation device shown in FIG. 1.

First, the GPS/INS calculation is executed (S1). While the GPS positioning signal is obtained, the integrated calculations of the satellite navigation and the inertial navigation are executed as described above. Further, while the GPS positioning signal is not obtained, only the inertial navigation calculation is executed.

Subsequently, the determination is made on whether or not the correction for the sensor detection value is appropriate (S2). The determination is made regardless of whether or not the GPS positioning signal is obtained. However, it may be in which the correction for the sensor detection value is presumed to be appropriate while the GPS positioning signal is obtained, and the determination is made on whether or not the correction for the sensor detection value is appropriate only in the case where the GPS positioning signal is not obtained.

If the correction is determined to be appropriate, the result of the GPS/INS calculation found at Step S1 is updated and informed to the user (S3). Further, if the correction is determined to be not appropriate, the positioning result is not updated, and a positioning result immediately before the positioning calculation is stopped is informed to the user (S4).

It may be when the above correction is determined to be appropriate, a process in which "a status representing a positioning state is enabled" is performed instead of a process in which "the result of the GPS/INS calculation is updated," and when the correction is determined to be not appropriate, a process in which "a status representing a positioning state is disabled" is performed instead of a process in which "the result of the GPS/INS calculation is not updated."

Figure 3:
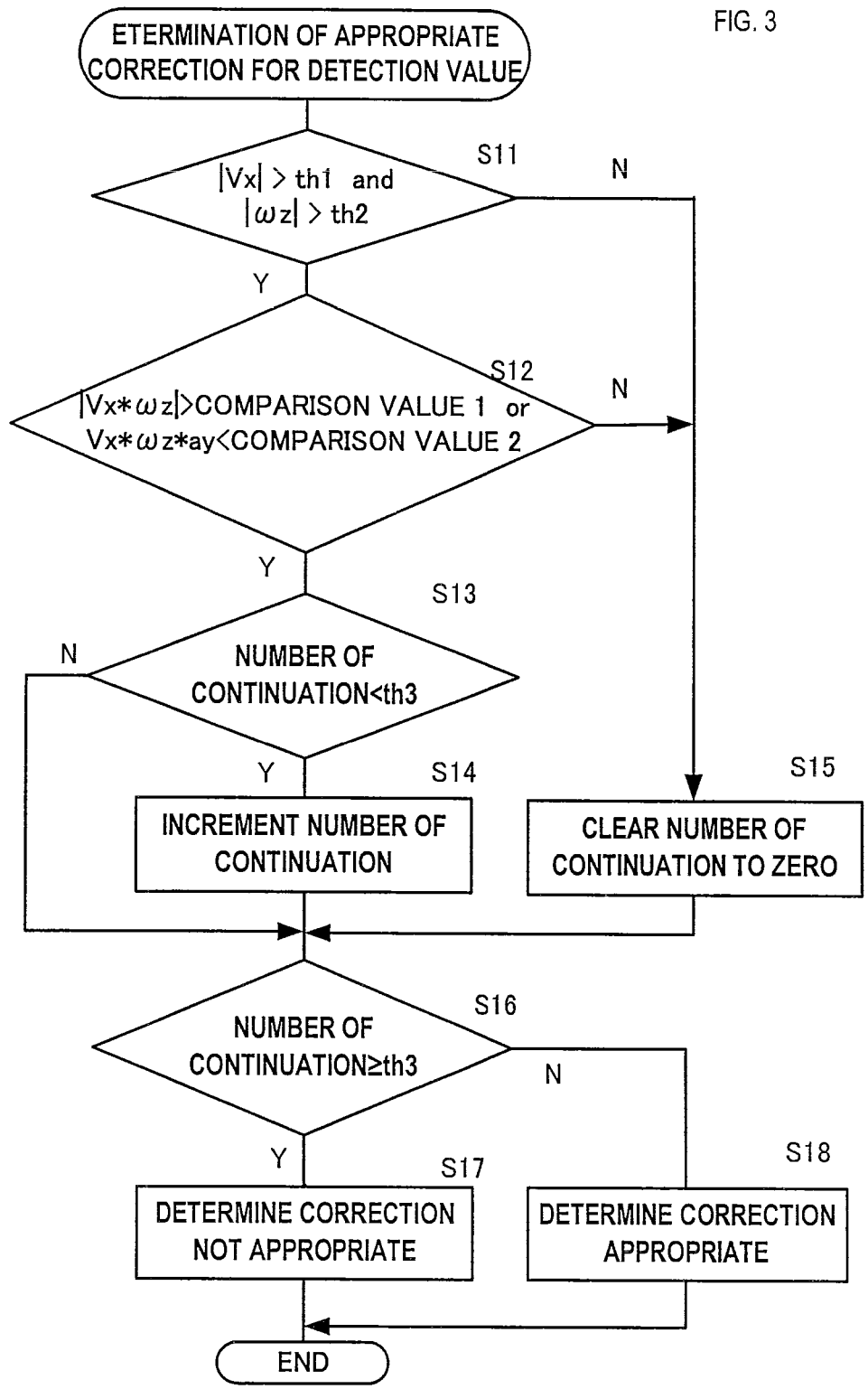
FIG. 3 is a flowchart showing an example of a specific content of determination processing of appropriate correction for the sensor detection value at Step S2 shown in FIG. 2.

FIG. 3 is a flowchart showing a specific example of the determination processing shown in FIG. 2 about whether or not the correction for the sensor detection value is appropriate. In FIG. 3, Vx represents a velocity obtained by correcting and integrating the detection value of the acceleration sensor 12 for detecting an acceleration of the moving body in the direction of forward movement (X-axis direction), ωz represents an angular velocity obtained by correcting the detection value of the angular velocity sensor 13 for detecting the angular velocity in an azimuth direction, and ay represents a centrifugal force obtained by correcting the detection value of the acceleration sensor 12 for detecting an acceleration in the right-left direction of the moving body (Y-axis direction).

First, the determination is made on whether or not an absolute value of the velocity Vx of the moving body (vehicle) in the direction of forward movement exceeds a predetermined threshold value th1 and whether or not an absolute value of the angular velocity ωz in the azimuth direction (gyration direction) exceeds a predetermined threshold value th2 (S11).

Further, the determination is made on whether or not an absolute value of the product of the velocity Vx and the angular velocity ωz exceeds a predetermined comparison value 1. Alternatively, the determination is made on whether or not the product of the velocity Vx and the angular velocity ωz has the same sign as the centrifugal force ay. As for this method, the determination is performed by determining whether or not the product of the three values of the velocity Vx, the angular velocity ωz and the centrifugal force ay is less than a predetermined comparison value 2 (S12).

If the determination conditions at the above Steps S11 and S12 are continuously satisfied, the number of the continuation thereof is counted (S13→S14).

When the above continuous number reaches a threshold value th3, the number is counted up no further (S13→S16). Moreover, if the determination conditions at Steps S11 and S12 are not satisfied before the above continuous number reaches the threshold value th3, the continuous number is cleared to be zero (S15).

After that, if the above continuous number reaches the threshold value th3, the correction for the sensor detection value is determined to be not appropriate (S16→S17). Further, while the continuous number is less than th3, the correction for the sensor detection value is determined to be appropriate (S18).

The determination processing shown in FIG. 3 is repeatedly performed, for example, once every one second.

Specific setting values of the respective threshold values and comparison values above are as follows.

Threshold value th1: 0.5 [m/s]
Threshold value th2: 5.0 [°/s]
Threshold value th3: 5 (times)
Comparison value 1: 3×|ay|+3×(observation noise of ay)
Comparison value 2: −1×th1×th2×(3×(observation noise of ay))

A method for setting the above threshold values and comparison values is as follows.

The threshold value th1 is set with a velocity which is presumed to be exceeded in forward movement. A velocity of a pedestrian is assumed to be around 50 cm/s, and a vehicle is assumed to be around 5 km/h, thus, the threshold value th1 may be set in a range of 0.5 m/s (=50 cm/s) to 18 m/s (=5 km/h).

The threshold value th2 is set with an angular velocity which is presumed to be exceeded in gyrating. It may be set in a range of around 1°/s to 10°/s assuming the pedestrian and vehicle.

A module that performs the determination processing using the threshold values th1 and th2 (Step S11 in FIG. 3) corresponds to a "sensor detection value appropriate correction determination module," according to Claim 1.

The reason why the determination is performed using the threshold value th3 is to avoid a case where a large noise is unexpectedly generated in the sensor detection value where it is erroneously determined to be not appropriate of the sensor correction. Assuming the sensor noise may be unexpectedly large several times, the threshold value th3 may be set several times (2 to 10).

The comparison value 1 is used for a determination whether the correction is performed appropriately comparing a magnitude of a value of the right-hand side (Vx·ωz) of Equation (1) with a magnitude of a value of the left-hand side ay of Equation (1). Therefore, the comparison value 1 may be set to the sum of a value obtained by multiplying the magnitude of ay (centrifugal force) by "(1+sensitivity error % of a catalog specification value of the acceleration sensor×0.01)" to "around 3 (a large multiplying factor is used because the lower in cost the acceleration sensor, the lower the detection accuracy for the centrifugal force)" and a value presumed to be not exceeded in stopping (around a value obtained by increasing the observation noise usually taken in stopping by a factor of 3 to 6).

The observation noise of the centrifugal force ay usually taken in stopping may be the catalog specification value of the acceleration sensor and a value measured in advance as a standard deviation of the centrifugal force ay in stopping.

The comparison value 2 is used for a determination whether or not a value obtained by multiplying the value of the right-hand side (Vx·ωz) of Equation (1) by the value of the left-hand side ay has a minus sign and an absolute value thereof is larger than a value presumed to be not exceeded in stopping. Therefore, the comparison value 2 may be set to the negative of a value obtained by multiplying a velocity presumed to be not exceeded in stopping (=threshold value th1) by an angular velocity presumed to be not exceeded in stopping (=threshold value th2), and by a centrifugal force presumed to be not exceeded in stopping (=around a value obtained by increasing the observation noise of ay usually taken in stopping by a factor of 3 to 6).

Note that when the conditions of Step S11 in FIG. 3 are not satisfied, the subsequent determination processing may be skipped. That is, when the moving body is stopping and moves in a straight line, the detection values of both the acceleration sensor in the X-axis direction and the angular velocity sensor take a small value, involving a possibility of the accurate determination not being performed. In such a case, the determination may not be performed on whether or not the correction for the sensor detection value is appropriate.

Second Embodiment

Figure 4:
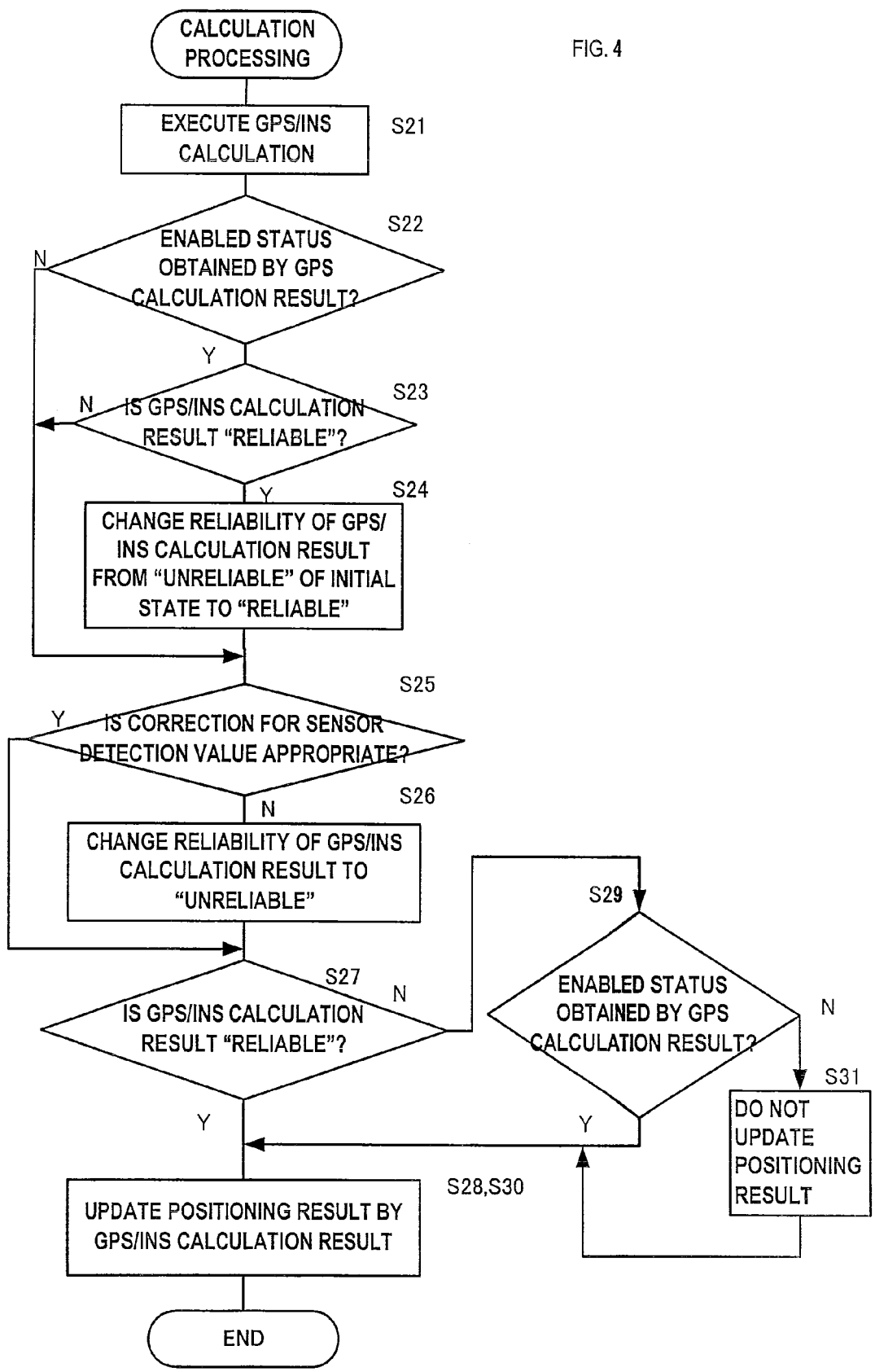
FIG. 4 is a flowchart showing a determination of appropriate correction for the sensor detection value and a processing content associated with a result of the determination in an integrated calculation module of a navigation device according to a second embodiment.

FIG. 4 is a flowchart showing a determination whether or not the correction for the sensor detection value is appropriate and a processing content associated with a result of the determination in an integrated calculation module of a navigation device according to a second embodiment. A configuration of hardware of the navigation device according to the second embodiment is similar to those shown in FIG. 1, and the determination content whether or not the correction for the sensor detection value is appropriate is similar to those shown in FIG. 3; thus, the description thereof is omitted. The processing content shown in FIG. 4 is as follows.

First, the GPS/INS calculation is executed. As described above, while the required GPS positioning signal is obtained, the navigation calculations of the satellite navigation and the inertial navigation are executed, and while the GPS positioning signal is not obtained, only the inertial navigation calculation is executed (S21).

Then, after the required GPS positioning signal is obtained, the determination is made among an enabled or disabled status on whether or not the enabled status is obtained due to the GPS calculation result (S22).

Subsequently, the determination is made on a reliability of the GPS/INS calculation result (S22). Specifically, if a difference between the GPS/INS calculation result and the GPS calculation result both obtained until the previous time is smaller than a predetermined value, the reliability of the GPS/INS calculation result is determined to be "reliable," and if larger than the predetermined value, the reliability of the GPS/INS calculation result is determined to be "unreliable" (S23). Then, if the reliability of the GPS/INS calculation result is determined to be "reliable," the reliability of the GPS/INS calculation result is changed from "unreliable" of the initial state to "reliable." If the reliability of the GPS/INS calculation result is determined to be "unreliable," the reliability of the GPS/INS calculation result is kept "unreliable" of the initial state (S24). Here, the predetermined value used for the determination is set to a value equal to or more than the error of the GPS calculation result.

After that, the determination is made on whether or not the correction for the sensor detection value is appropriate (S25). The determination on whether or not the correction for the sensor detection value is appropriate is similar to Step S2 shown in FIG. 2 (processing in FIG. 3), and the description thereof is omitted.

If the sensor detection value is determined to be not appropriately corrected, the reliability of the GPS/INS calculation result is changed to "unreliable" (S26).

Then, the determination is made on the reliability of the GPS/INS calculation result (S27). Specifically, a processing similar to Step S23 is performed, and as a result, if the reliability of the GPS/INS calculation result is determined to be "reliable," the GPS/INS calculation result is used to update the positioning result (S28).

If the reliability of the GPS/INS calculation result is determined to be "unreliable," the determination is made on whether or not the enabled status is obtained in the GPS calculation result (S29). Then, if the enabled status is obtained in the GPS positioning result, the GPS calculation result is used to update the positioning result (S30). However, if the reliability of the GPS/INS calculation result is determined to be "unreliable" and the disabled status is obtained in the GPS calculation result, the positioning result is not updated (S31).

It may be in which when the reliability of the above GPS/INS calculation result is determined to be "reliable," a processing in which "a status representing a positioning state is enabled" is performed instead of the processing in which "the GPS/INS calculation result is updated," and when the reliability of the GPS/INS calculation result is determined to be "unreliable," a process in which "a status representing a positioning state is disabled" is performed instead of the process in which "the GPS/INS calculation result is not updated."

In the processing of the first embodiment shown in FIGS. 2 and 3, when the moving body moves in a straight line or is stopping, the determination at Step S11 in FIG. 3 is always "NO," and the continuous number is cleared to be 0 (zero), and thus, the sensor detection value is determined to be corrected appropriately, making the positioning result updated. On the contrary, in the second embodiment shown in FIG. 4, when the GPS is being interrupted, if the sensor detection value is determined to be not appropriately corrected, the positioning result is not updated until the GPS positioning is resumed. Therefore, the positioning result degraded in accuracy is prevented from being output.

Further, in the first embodiment shown in FIGS. 2 and 3, if the sensor detection value is determined to be not appropriately corrected, the positioning result is not updated even if the GPS calculation result is enabled. However, in the second embodiment shown in FIG. 4, if the GPS calculation result is enabled, the positioning result is immediately updated due to the GPS positioning calculation.

The corrected sensor detection value (acceleration, angular velocity) corresponds to a derivative value of the GPS/INS calculation result; therefore, an integrated value without validity is not reliable. Thus, if the sensor detection value is determined to be not appropriately corrected, the GPS/INS calculation result is unreliable. However, the correction for the sensor detection value being appropriate only means that the derivative value of the GPS/INS calculation result is reliable. Thus, even if the sensor detection value is determined to be appropriately corrected, the GPS/INS calculation result is not always reliable. Consequently, as at Steps (S25→S26) in FIG. 4, if the sensor detection value is determined to be not appropriately corrected, the reliability of the GPS/INS calculation result is changed to "unreliable."

Note that in the embodiments shown above, the example where the GPS is used for the satellite navigation positioning is shown, but is similarly applicable in a case of using another satellite navigation positioning system.

INDUSTRIAL APPLICABILITY

The present invention is applicable to a satellite navigation/dead-reckoning navigation integrated positioning device that integrates an observation obtained by receiving a positioning signal from a navigation satellite and an observation obtained from an external sensor such as an acceleration sensor to perform positioning.

BRIEF DESCRIPTION OF THE NUMERALS

11 . . . GPS Receiver, 12 . . . Acceleration Sensor, 13 . . . Angular Velocity Sensor, 20 . . . Tracking Processing Module, 21 . . . GPS/INS Calculation Module, 22 . . . Sensor Detection Value Appropriate Correction Judgment Module, 30 . . . Integrated Calculation Module, and 100 . . . Navigation Device.

What is claimed is:

1. A satellite navigation/dead-reckoning navigation integrated positioning device, comprising:

an integrated positioning calculation module for finding navigation data of a moving body based on a positioning signal of a navigation satellite and a detection value of an external sensor and finding a correction value for the detection value of the external sensor to feedback to the detection value of the external sensor, the external sensor including at least an acceleration sensor for detecting an acceleration and an angular velocity sensor for detecting an angular velocity, the acceleration sensor being an acceleration sensor for detecting at least two-axis accelerations in an X-axis direction that is a front-back direction of the moving body and a Y-axis direction that is a right-left direction of the moving body, and the angular velocity sensor being an at least one-axis angular velocity sensor for detecting the angular velocity in an azimuth direction around a Z-axis orthogonal to the X-axis direction and the Y-axis direction; and a sensor detection value appropriate correction determination module for finding a product of a velocity in the X-axis direction obtained by integrating the detection value of the acceleration sensor for detecting the acceleration in the X-axis direction and the detection value of the angular velocity sensor and finding a difference between the detection value of the acceleration sensor for detecting the acceleration in the Y-axis direction and the product to determine whether or not the detection values of the acceleration sensor and the angular velocity sensor are appropriate by determining whether or not the difference exceeds a predetermined threshold value to correct the detection values of the acceleration sensor and the angular velocity sensor, and wherein the sensor detection value appropriate correction determination module is configured to judge whether the correction of a value detected by the external sensor is appropriate or not based on said corrected detection values.

2. The satellite navigation/dead-reckoning navigation integrated positioning device according to claim 1, wherein the integrated positioning calculation module, when the detection value is determined to be appropriate, continues positioning calculations using the detection values of the acceleration sensor and the angular velocity sensor or outputs a result of the positioning calculation, and when the detection value is determined to be not appropriate, stops the positioning calculations using the detection value of the external sensor or outputs a result of the positioning calculation immediately before stopping the positioning calculation other than the result of the positioning calculation using the detection value of the external sensor.

3. The satellite navigation/dead-reckoning navigation integrated positioning device of claim 2, wherein the appropriate correction determination module performs the determination when an absolute value of a velocity in an X-axis direction and an absolute value of the angular velocity in an azimuth direction respectively exceeds a predetermined threshold value.

4. The satellite navigation/dead-reckoning navigation integrated positioning device of claim 2, wherein the appropriate correction determination module performs the determination depending on whether or not an absolute value of a product of a velocity in an X-axis direction and the angular velocity in an azimuth direction exceeds a comparison value including an absolute value of the acceleration in an Y-axis direction.

5. The satellite navigation/dead-reckoning navigation integrated positioning device of claim 2, wherein the appropriate correction determination module performs the determination depending on whether or not a product of a velocity in an X-axis direction and the angular velocity in an azimuth direction has the same sign as the acceleration in an Y-axis direction.

6. The satellite navigation/dead-reckoning navigation integrated positioning device of claim 1, wherein the appropriate correction determination module performs the determination when an absolute value of a velocity in an X-axis direction and an absolute value of the angular velocity in an azimuth direction respectively exceeds a predetermined threshold value.

7. The satellite navigation/dead-reckoning navigation integrated positioning device of claim 6, wherein the appropriate correction determination module performs the determination depending on whether or not an absolute value of a product of a velocity in an X-axis direction and the angular velocity in an azimuth direction exceeds a comparison value including an absolute value of the acceleration in an Y-axis direction.

8. The satellite navigation/dead-reckoning navigation integrated positioning device of claim 6, wherein the appropriate correction determination module performs the determination depending on whether or not a product of a velocity in an X-axis direction and the angular velocity in an azimuth direction has the same sign as the acceleration in an Y-axis direction.

9. The satellite navigation/dead-reckoning navigation integrated positioning device of claim 1, wherein the appropriate correction determination module performs the determination depending on whether or not an absolute value of a product of a velocity in an X-axis direction and the angular velocity in an azimuth direction exceeds a comparison value including an absolute value of the acceleration in an Y-axis direction.

10. The satellite navigation/dead-reckoning navigation integrated positioning device of claim 9, wherein the appropriate correction determination module performs the determination depending on whether or not a product of a velocity in an X-axis direction and the angular velocity in an azimuth direction has the same sign as the acceleration in an Y-axis direction.

11. The satellite navigation/dead-reckoning navigation integrated positioning device of claim 1, wherein the appropriate correction determination module performs the determination depending on whether or not a product of a velocity in an X-axis direction and the angular velocity in an azimuth direction has the same sign as the acceleration in an Y-axis direction.

* * * * *